United States Patent
Lin et al.

(10) Patent No.: US 8,340,673 B2
(45) Date of Patent: Dec. 25, 2012

(54) CALL DELIVERY TO A DUAL MODE WIRELESS DEVICE

(75) Inventors: Yuhui J. Lin, Napperville, IL (US); Jiten A. Shah, Naperville, IL (US); Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 430 days.

(21) Appl. No.: 11/421,110

(22) Filed: May 31, 2006

(65) Prior Publication Data

US 2007/0281704 A1 Dec. 6, 2007

(51) Int. Cl.
*H04W 40/00* (2009.01)

(52) U.S. Cl. .......... 455/445; 455/435.1; 455/435.2; 455/428; 455/422.1; 455/433; 370/352; 370/353; 370/354; 370/355; 370/356; 370/395.52; 370/328

(58) Field of Classification Search .......... 455/435.1, 455/435.2, 445, 428, 422.1, 433; 370/352–356, 370/395.52, 328

See application file for complete search history.

(56) References Cited

U.S. PATENT DOCUMENTS

| | | | | |
|---|---|---|---|---|
| 4,918,438 | A * | 4/1990 | Yamasaki | 340/7.58 |
| 7,440,763 | B2 * | 10/2008 | Lundsjo et al. | 455/458 |
| 2002/0090975 | A1 * | 7/2002 | Laiho et al. | 455/552 |
| 2004/0209615 | A1 * | 10/2004 | Lamb et al. | 455/433 |
| 2005/0058143 | A1 | 3/2005 | Kikuchi et al. | |
| 2006/0092925 | A1 * | 5/2006 | Svensson et al. | 370/352 |
| 2006/0229101 | A1 * | 10/2006 | LaBauve et al. | 455/560 |
| 2006/0286984 | A1 * | 12/2006 | Bonner | 455/445 |
| 2007/0076691 | A1 * | 4/2007 | Varney et al. | 370/352 |
| 2007/0100981 | A1 * | 5/2007 | Adamczyk et al. | 709/223 |
| 2008/0102870 | A1 * | 5/2008 | Gothard et al. | 455/518 |

FOREIGN PATENT DOCUMENTS

| | | |
|---|---|---|
| EP | 1507430 | 2/2005 |
| EP | 1507430 A2 * | 2/2005 |
| EP | 1513290 | 3/2005 |
| EP | 1659744 | 5/2006 |
| GB | 2380898 * | 4/2003 |
| JP | 2002374290 | 12/2002 |
| JP | 2006074603 A | 3/2006 |
| KR | 2004-41685 | 9/2008 |
| WO | WO98/48587 | 10/1998 |

* cited by examiner

*Primary Examiner* — Wayne Cai
*Assistant Examiner* — Shantell L Heiber
(74) *Attorney, Agent, or Firm* — Duft Bornsen & Fishman LLP (57) ABSTRACT

Communication networks and methods are disclosed that provide call delivery to a dual mode wireless device served by a wireless data network (e.g., WiFi/IMS network) and a wireless voice network (e.g., cellular network). A call control function in the wireless data network is adapted to receive a call to the dual mode wireless device. The call control function transmits a ping message to the dual mode wireless device over the wireless data network to determine if the device is available over the wireless data network for the call. If the call control function receives a response to the ping message from the device, then the call control function attempts to set up the call over the wireless data network. If the call control function does not receive a response to the ping message, then the call control function may attempt to set up the call over the wireless voice network.

15 Claims, 7 Drawing Sheets

CALL DELIVERY TO A DUAL MODE WIRELESS DEVICE

RELATED CASES

This application is related to a previous patent application having the Ser. No. 11/226,173.

BACKGROUND OF THE INVENTION

1. Field of the Invention

The invention is related to the field of communication networks and, in particular, to providing call delivery to a dual mode wireless device.

2. Statement of the Problem

Wireless phone providers are developing dual mode phones that have the functionality for communicating with a cellular network (e.g., CDMA or GSM) and another type of wireless data network, such as a WiFi network (e.g., 802.11b, 802.11g, etc). The concept of the dual mode phone is to allow a user the flexibility to communicate with either the cellular network or a WiFi network. WiFi networks are typically used for data communications such as Internet browsing, email, etc. WiFi networks may also be used for voice communications in the form of VoIP calls. Cellular networks are typically used for voice communications, but have also been adapted for data communications.

The dual mode phones take advantage of local WiFi "hot spots" in a corporation or enterprise, airports, book stores, coffee shops, etc, that are becoming more common. When a dual mode phone is in range of a WiFi hot spot, the phone may access the Wireless LAN (WLAN) for data communications, VoIP calls, etc. The WLAN generally provides a higher bandwidth than cellular networks for more efficient data transfer. If the dual mode phone roams out of a WLAN, then the phone can switch over to the cellular network for voice or data communication.

A WiFi network may be integrated with an IP Multimedia Subsystem (IMS). The $3^{rd}$ Generation Partnership Project (3GPP) has set forth specifications describing the architecture of IMS networks and networking. Service providers are accepting this architecture in next generation network evolution. The IMS architecture is initially defined by the 3GPP to provide multimedia services to mobile subscribers over an IP network. IP networks have become the most cost savings bearer network to transmit video, voice, and data. IMS uses the advantage of IP networks to provide multimedia services for IMS subscribers on an IMS platform. The signaling used within IMS networks is generally Session Initiation Protocol (SIP). IMS defines the standard SIP interface between application servers (AS), the IMS core network (CSCF), the IMS subscriber (user), the IMS database (HSS), and IMS billing elements.

The capability of a phone communicating with two different types of wireless networks creates networking issues. For instance, if a calling party dials a number for a mobile subscriber having a dual mode phone, that call may be routed to the phone over either the cellular network or the WiFi/IMS network. One problem facing network managers is call delivery when there are two wireless networks available to the dual mode phone. More particularly, network managers need to determine which network to route the call over so that it may be received by the dual mode phone. There are currently no standards available to address the call delivery issues for dual mode subscribers.

Another problem created by mobile subscribers is that they may roam in and out of service areas of the wireless networks (cellular and WiFi/IMS). When a dual mode phone is in range of a cellular network, the dual mode phone registers with the cellular network. Similarly, when the dual mode phone is in range of the WiFi/IMS network, the dual mode phone also registers with the WiFi/IMS network. A subscriber database in the cellular network (e.g., Home Location Register (HLR)) and a subscriber database in the WiFi/IMS network (e.g., Home Subscriber Server (HSS)) each store a subscriber record that indicates if the dual mode phone is presently registered.

After the dual mode phone is registered in the wireless networks, the mobile subscriber may roam out of the service area of one or both of the networks. This may particularly be a problem in WiFi/IMS networks as the service areas are generally small as compared to the service areas of well established cellular networks. As an example, if the mobile subscriber is in a downtown of a city, the mobile subscriber may be in range of a WiFi/IMS network provided by coffee shops, restaurants, etc. If the mobile subscriber walks two or three blocks away from the downtown area, the WiFi/IMS network may be out of range. Even if the mobile subscriber moves out of range of the WiFi/IMS network, the subscriber database of the WiFi/IMS network may still indicate that the dual mode phone of the mobile subscriber is registered with the network. If a call is received for the mobile subscriber, the WiFi/IMS network will attempt to connect the call to the mobile subscriber because the dual mode phone is still indicated as registered. The WiFi/IMS network may spend unnecessary time trying to connect a call to the dual mode phone that is no longer in range of the WiFi/IMS network. For instance, in an IMS network the Call Serving Control Function (CSCF) receiving the call to the dual mode phone will transmit a SIP INVITE message to the dual mode phone and wait for a response (e.g., a SIP 200 OK message). If no response is received after a time period, then the CSCF will transmit a SIP TRYING message to the originating network of the call (e.g., the PSTN). The CSCF may also transmit another INVITE message to the dual mode phone and wait again for a response. Depending on how the IMS network is provisioned, the CSCF may transmit several messages to the dual mode phone and several messages to the originating network in an attempt to connect the call to the dual mode phone. If the CSCF is unsuccessful in connecting the call, which will be the case if the mobile subscriber is out of range of the WiFi/IMS network, the CSCF will then initiate secondary call treatments for the call, such as routing the call to voice mail.

If the mobile subscriber does not move back into a service area of the WiFi/IMS network, the WiFi/IMS network will eventually end the registration of the dual mode phone (also referred to as a time out). Unfortunately, the time out of a dual mode phone may be an hour, two hours, or more during which time the WiFi/IMS network may be wasting time trying to connect calls to the dual mode phone.

SUMMARY OF THE SOLUTION

The invention solves the above and other related problems by determining the availability of a dual mode wireless device in a wireless data network (e.g., a WiFi/IMS network) before attempting to set up the call to the dual mode wireless device. If the dual mode wireless device is not presently available (i.e., has moved out of the service area of the network), then the wireless data network does not spend time and allocate resources in attempting to set up the call to the dual mode wireless device. The wireless data network may instead attempt to connect the call to the dual mode wireless device over a wireless voice network (e.g., a cellular network). This advantageously provides more efficient use of network resources in the wireless data network and allows for more efficient and effective delivery of calls to dual mode wireless devices.

In one embodiment of the invention, a communication network includes a wireless data network and a wireless voice network. An example of the wireless data network includes an IMS network and a Wireless Local Area Network (WLAN) using WiFi/WiMax communications (also referred to as a WiFi/IMS network). An example of the wireless voice network includes a cellular network, such as a CDMA network or a GSM network. The wireless data network and the wireless voice network are both adapted to communicate with a dual mode wireless device. In this embodiment, it is assumed that the dual mode wireless device has registered with the wireless data network and the wireless voice network.

If a call is originated from a calling party to the dual mode wireless device, then a call control function in the wireless data network receives the call to the dual mode wireless device. The call control function transmits a ping message to the dual mode wireless device over the wireless data network to determine if the dual mode wireless device is available over the wireless data network for the call. If the call control function receives a response to the ping message from the dual mode wireless device, then the call control function transmits a call setup message to the dual mode wireless device over the wireless data network to attempt to set up the call over the wireless data network. If the call control function does not receive a response to the ping message from the dual mode wireless device (such as after a defined time period), then the call control function is able to determine that the dual mode wireless device is not available over the wireless data network. The call control function may then transmit a call setup message to the dual mode wireless device over the wireless voice network to attempt to set up the call over the wireless voice network.

If the wireless data network is a SIP-based network, then the call control function may transmit a SIP OPTIONS message as the ping message. According to SIP protocol, the OPTIONS message is not provisioned to cause the dual mode wireless device to provide ring tones to the mobile subscriber. If the call control function receives a response to the ping message, then the call control function may transmit a SIP INVITE message as the call setup message over the wireless data network. The SIP INVITE message is provisioned to cause the dual mode wireless device to provide ring tones and thus initiate call setup. The SIP OPTIONS message can provide a quick test as to the availability of the dual mode wireless device over the wireless data network without the overhead associated with a SIP INVITE message, such as transmitting a SIP TRYING message, transmitting subsequent INVITE messages, etc.

The invention may include other exemplary embodiments described below.

DESCRIPTION OF THE DRAWINGS

The same reference number represents the same element or same type of element in the drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
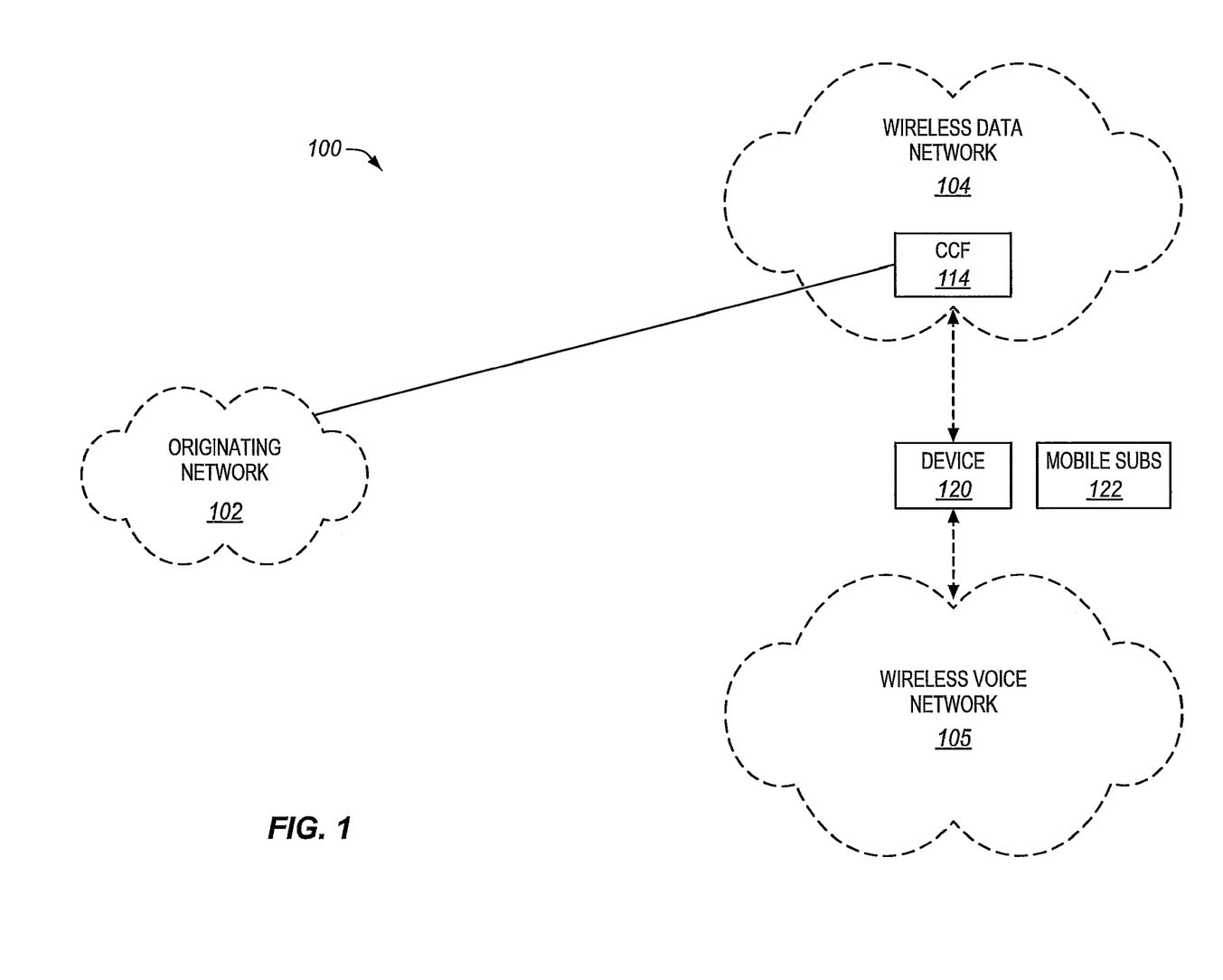
FIG. 1 illustrates a communication network in an exemplary embodiment of the invention.

FIG. 1 illustrates a communication network 100 in an exemplary embodiment of the invention. Communication network 100 includes an originating network 102, a wireless data network 104, and a wireless voice network 105. The network clouds illustrating the networks are not being used to show the actual service areas of the networks, as the service areas may be separate or overlap. Wireless data network 104 and wireless voice network 105 are separate networks generally used for different purposes (one for data, one for voice). However, both networks 104-105 may be managed or owned by a common service provider. Wireless data network 104 and wireless voice network 105 are both adapted to provide communication services to dual mode wireless device 120. Communication network 100 may include other networks, systems, or devices not shown in FIG. 1.

Originating network 102 comprises any network adapted to transport a call to one or both of wireless data network 104 and wireless voice network 105. Examples of originating network 102 include a circuit-based network (e.g., a Public Switched Telephone Network (PSTN)) or a packet-based network (e.g., an internet). In this embodiment, originating network 102 is provisioned to transmit calls to wireless data network 104 first, but may be provisioned differently in other embodiments.

Wireless data network 104 comprises any network that typically provides data communications via wireless signals. An example of wireless data network 104 includes a Wireless Local Area Network (WLAN) using WiFi/WiMax communications. The internal networking of wireless data network 104 may use technologies such as the IMS architecture described by the 3GPP. An example implementation of wireless data network 104 may be as an enterprise network in a corporation or campus, or as a "hot spot" in popular public places, such as an airport, coffee shop, etc. Although wireless data network 104 is typically used for data communication, those skilled in the art understand that data networks may transport voice communications, such as VoIP calls. Wireless data network 104 may thus also be referred to as a wireless VoIP network.

Wireless data network 104 includes a call control function (CCF) 114 adapted to serve dual mode wireless device 120. An example of CCF 114 in an IMS network may be a Call Serving Control Function (CSCF) and/or an Application Server (AS). Device 120 is being operated by a mobile subscriber 122 that subscribes to a dual mode service offered by a service provider.

Wireless voice network 105 comprises any network that typically provides voice communications via wireless signals. An example of wireless voice network 105 includes a cellular network, such as a CDMA network or a GSM network. Although wireless voice network 105 is typically used for voice communication, those skilled in the art understand that voice networks may also transport data communications.

Assume that mobile subscriber 122 is in range of both of wireless data network 104 and wireless voice network 105 at some point. When mobile subscriber 122 is in range of wireless data network 104, device 120 registers with wireless data network 104. When mobile subscriber 122 is in range of wireless voice network 105, device 120 registers with wireless voice network 105. At a subsequent time, mobile subscriber 122 may roam out of the service area of one or both of wireless data network 104 and wireless voice network 105, but will still be indicated as registered in a subscriber record of wireless data network 104 and/or wireless voice network 105.

Assume that originating network 102 receives a call to device 120 from a calling party (not shown). The call may comprise a traditional circuit-based call or a VoIP call. Originating network 102 is provisioned to route the call to wireless data network 104 in this embodiment.

Figure 2:
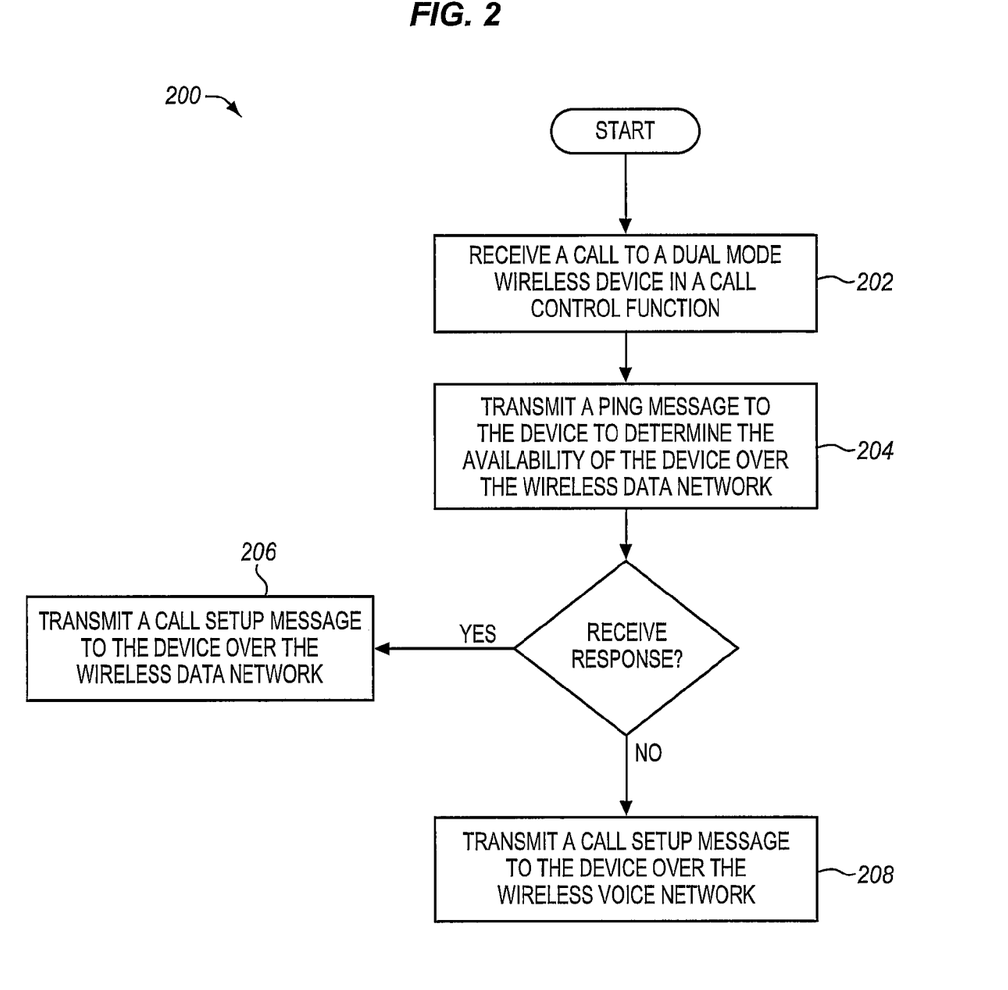
FIG. 2 is a flow chart illustrating a method of providing call delivery to a dual mode wireless device in an exemplary embodiment of the invention.

FIG. 2 is a flow chart illustrating a method 200 of providing call delivery to a dual mode wireless device in an exemplary embodiment of the invention. The steps of method 200 will be described with reference to communication network 100 in FIG. 1. The steps of the flow chart in FIG. 2 are not all inclusive and may include other steps not shown.

In step 202 of method 200, CCF 114 receives the call routed by originating network 102. Responsive to receiving the call, CCF 114 transmits a ping message to device 120 over wireless data network 104 to determine if device 120 is available over wireless data network 104 for the call in step 204. The ping message comprises any message adapted to determine the availability of device 120 without having to attempt call setup to device 120. For instance, if wireless data network 104 is SIP-based, then the ping message may comprise a SIP OPTIONS message. The SIP OPTIONS message is not traditionally used in SIP-based networks for call setup. Thus, wireless data network 104 and device 120 do not perform the normal call setup processes responsive to the OPTIONS message. The OPTIONS message is intended to illicit a response (i.e., a SIP 200 OK message) from device 120 without initiating call setup processes or causing device 120 to provide a ring tone to mobile subscriber 122.

If call control function 114 receives a response to the ping message from device 120, then call control function 114 is able to identify that device 120 is available for the call over wireless data network 104. In other words, device 120 is presently in the service area of wireless data network 104. Call control function 114 then transmits a call setup message to device 120 over wireless data network 104 to attempt to set up the call over wireless data network 104 in step 206. If wireless data network 104 is SIP-based, then the call setup message may comprise a SIP INVITE message. Normal call setup may then take place to connect the call to device 120 over wireless data network 104.

If call control function 114 does not receive a response to the ping message from device 120 (such as after a defined time period), then call control function 114 is able to identify that device 120 is not available for the call over wireless data network 104. In other words, device 120 may have roamed out of the service area of wireless data network 104 even though device 120 is registered with wireless data network 104. Call control function 114 may then transmit a call setup message to device 120 over wireless voice network 105 to attempt to set up the call over wireless voice network 104 in step 208. Normal call setup may then take place to connect the call to device 120 over wireless voice network 105. In an alternative embodiment, call control function 114 may initiate secondary call treatments, such as if device 120 is not available over wireless voice network 105 or if call control function 114 is provisioned to do so.

The above method 200 advantageously provides an effective method of call delivery to device 120. By determining the availability of device 120 in wireless data network 104 before attempting to set up the call, time and network resources are more efficiently used for times when mobile subscriber 122 has roamed out of the service area of wireless data network 104. Method 200 also allows for calls to be routed to device 120 through wireless voice network 105 if mobile subscriber 122 has happened to roam out of the service area of wireless data network 104.

FIGS. 3-7 illustrate examples of call delivery to a dual mode phone in exemplary embodiments of the invention.

Figure 3:
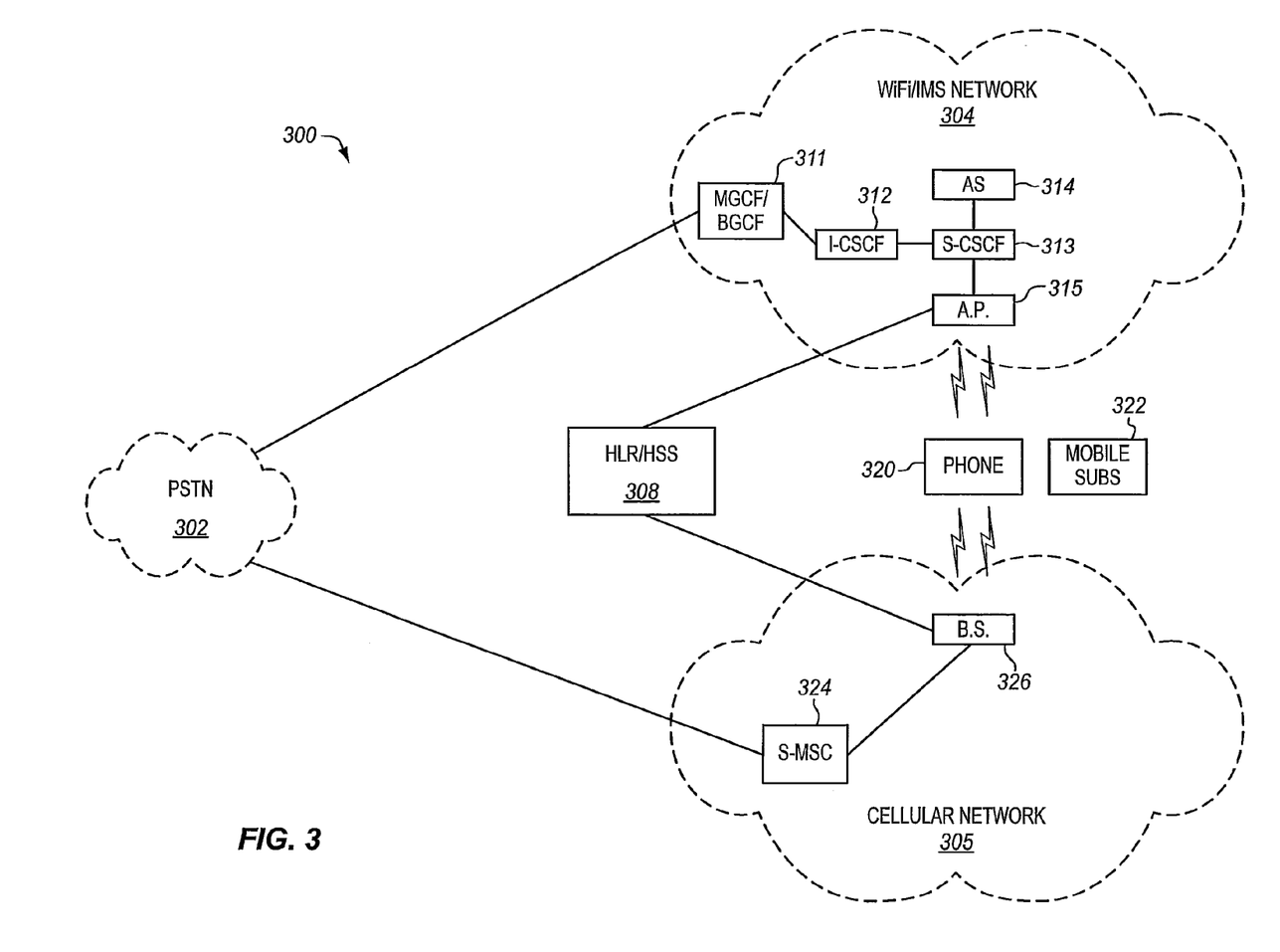
FIG. 3 illustrates another embodiment of a communication network.

FIG. 3 illustrates another embodiment of a communication network 300 in an exemplary embodiment of the invention. Communication network 300 includes a PSTN 302, a WiFi/IMS network 304, a cellular network 305, and a combined HLR/HSS element 308. The network clouds illustrating the networks 304-305 are not being used to show the actual service areas of the networks, as the service areas may be separate or overlap. WiFi/IMS network 304 and cellular network 305 are separate networks generally used for distinct purposes. WiFi/IMS network 304 is generally used for data communications. Cellular network 305 is generally used for voice communications. However, networks 304-305 and HLR/HSS 308 may be managed by the same service provider, such as Verizon, Sprint, Cingular, etc. HLR/HSS 308 is shown as being outside of networks 304-305, but HLR/HSS 308 may be implemented inside either or both of networks 304-305 or may be implemented in a remote system. Communication network 300 may include other networks, systems, or devices not shown in FIG. 3.

WiFi/IMS network 304 is a combined IMS network and WiFi/WiMax network using wireless technologies, such as 802.11b or 802.11g. WiFi/IMS network 304 may comprise an enterprise network in a large corporation, a large campus, etc. WiFi/IMS network 304 includes a Media Gateway Control Function (MGCF)/Brealcout Gateway Control Function (BGCF) 311, an Interrogate Call Session Control Function (I-CSCF) 312, a Serving Call Session Control Function (S-CSCF) 313, an Application Server (AS) 314, and a WiFi access point (A.P.) 315. MGCF/BGCF 311, I-CSCF 312, S-CSCF 312, and AS 314 are known to those familiar with the 3GPP specifications on IMS networks. Access point 315 is a WiFi/WiMax transceiver used to communicate with WiFi devices, such as dual mode phone 320. WiFi/IMS network 304 may include many more access points 315 that are not shown for the sake of brevity.

Cellular network 305 comprises any cellular network, such as a CDMA network or a GSM network. Cellular network 305 includes a Serving Mobile Switching Center (S-MSC) 324 and a base station (B.S.) 326. S-MSC 324 includes a Visitor Location Register (VLR) as is known in the art.

HLRs are known in cellular networks as databases used to store subscriber records. Similarly, HSSs are known in IMS networks as databases used to store subscriber records. HLR/HSS 308 is a combined HLR/HSS. HLR/HSS 308 may be a physically combined unit, or may comprise multiple units that synchronize their subscriber data such that they appear to be a single unit. HLR/HSS 308 may be accessible by either WiFi/IMS network 404 or cellular network 405 so that either network 404 or 405 may retrieve subscriber data.

Mobile subscriber 322 of phone 320 may be in range of one or both of WiFi/IMS network 304 and cellular network 305. When mobile subscriber 322 is in range of WiFi/IMS network 304, phone 320 registers with WiFi/IMS network 304. When mobile subscriber 322 is in range of cellular network 305, then phone 320 registers with cellular network 305. When phone 320 registers with either orboth of networks 304-305, HLR/HSS 308 is updated with the proper subscriber data. At a subsequent time, mobile subscriber 322 may roam out of the service area of one or both of networks 304-305, but may still be indicated as registered in a subscriber record stored in HLR/HSS 308.

Assume that PSTN 302 receives a call to phone 320 from a calling party (not shown). PSTN 302 is provisioned to route the call to WiFi/IMS network 304 in these embodiments. FIGS. 4-7 are message diagrams illustrating examples of call delivery in communication network 300.

Figure 4:
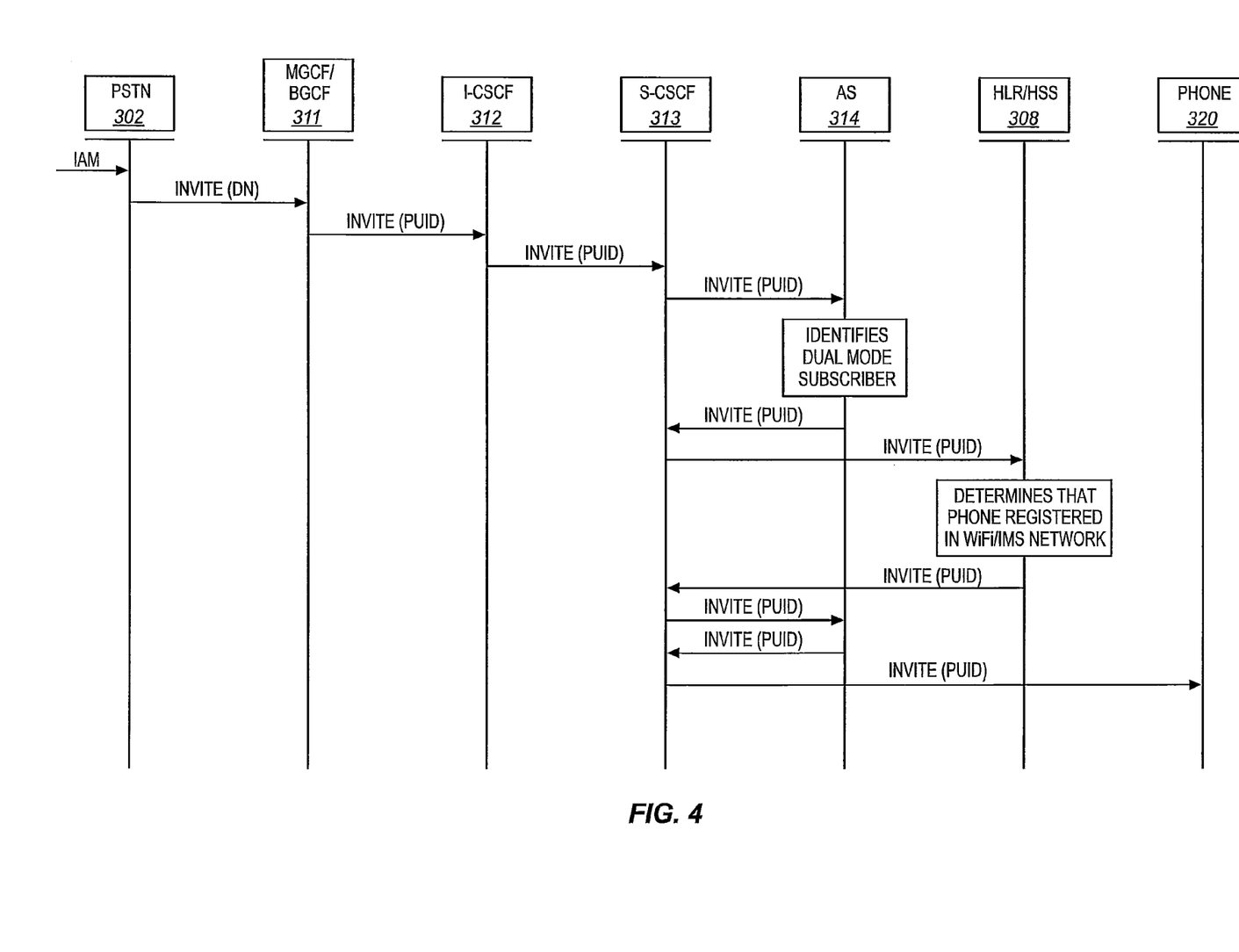
FIGS. 4-7 are message diagrams illustrating examples of call delivery in the communication network of FIG. 3.

FIG. 4 illustrates an example where phone 320 is registered in WiFi/IMS network 304 and not cellular network 305. PSTN 302 receives the call to phone 320 in the form of a call setup message, such as an Initial Address Message (IAM) or some other ISDN User Part (ISUP) message. PSTN 302 transmits a SIP INVITE message to MGCF/BGCF 311. The INVITE message includes a Public User Identifier (PUID) for phone 320 or mobile subscriber 322. MGCF/BGCF 311 then transmits an INVITE message to S-CSCF 313 through I-CSCF 312. S-CSCF 313 transmits an INVITE message to AS 314. AS 314 identifies that mobile subscriber 322 is a dual mode subscriber based on the PUID. AS 314 then transmits an INVITE message to HLR/HSS 308 through S-CSCF 313 to determine the registration status of phone 320.

Responsive to the INVITE message, HLR/HSS 308 determines in which network 304 or 305 phone 320 is registered. In this example, phone 320 is registered in WiFi/IMS network 304. HLR/HSS 308 transmits an INVITE message to S-CSCF 313 indicating that phone 320 is registered in WiFi/IMS network 304. S-CSCF 313 transmits an INVITE message to AS 314 indicating that S-CSCF 313 received a valid response from HLR/HSS 308. S-CSCF 313 also transmits an INVITE message to phone 320 through access point 315 and possibly other systems to complete the call through WiFi/IMS network 304 to phone 320.

If phone 320 was registered in another external HSS (not shown), then HLR/HSS 308 would use standards-based subscribe/notify functionality via the Diameter interface to get the subscriber-related data. S-CSCF 313 may then route the call based on the acquired subscriber-related data.

Figure 5:
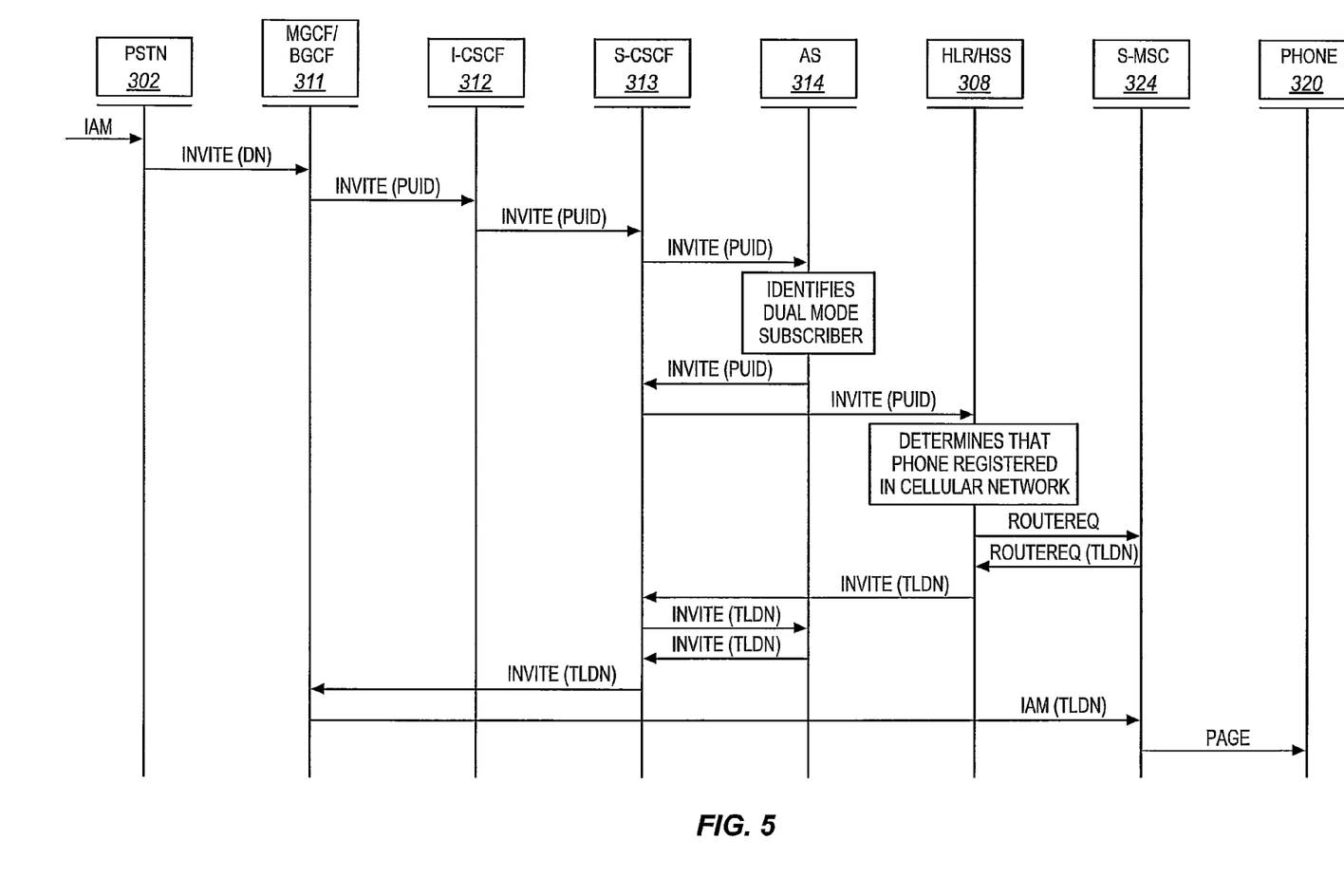

FIG. 5 illustrates an example where phone 320 is registered in cellular network 305 and not WiFi/IMS network 304. The messaging in FIG. 5 flows as in FIG. 4 so that HLR/HSS 308 receives an INVITE message from S-CSCF 313. Responsive to the INVITE message, HLR/HSS 308 determines in which network 304 or 305 phone 320 is registered. In this example, phone 320 is registered in cellular network 305. HLR/HSS 308 transmits a route request message (ROUTREQ) message to S-MSC 324 (or an associated Visitor Location Register (VLR)) to determine routing information for the call. S-MSC 324 responds with a route request message indicating a temporary local directory number (TLDN) for the call. Responsive to the route request message, HLR/HSS 308 transmits an INVITE message to S-CSCF 313 indicating the TLDN. S-CSCF 313 transmits an INVITE message to AS 314 indicating that S-CSCF 313 received a valid response from HLR/HSS 308.

Based on the response from HLR/HSS 308, S-CSCF 313 is able to determine that the call needs to be routed to cellular network 305. Thus, S-CSCF 313 transmits an INVITE message to MGCF/BGCF 311 indicating the TLDN for the call. Based on the TLDN, MGCF/BGCF 311 transmits an IAM to S-MSC 324 to complete the call to phone 320 through cellular network 305. For instance, S-MSC 324 receives the IAM, and transmits the appropriate call setup signaling to phone 320 through base station 326, such as a page.

Figure 6:
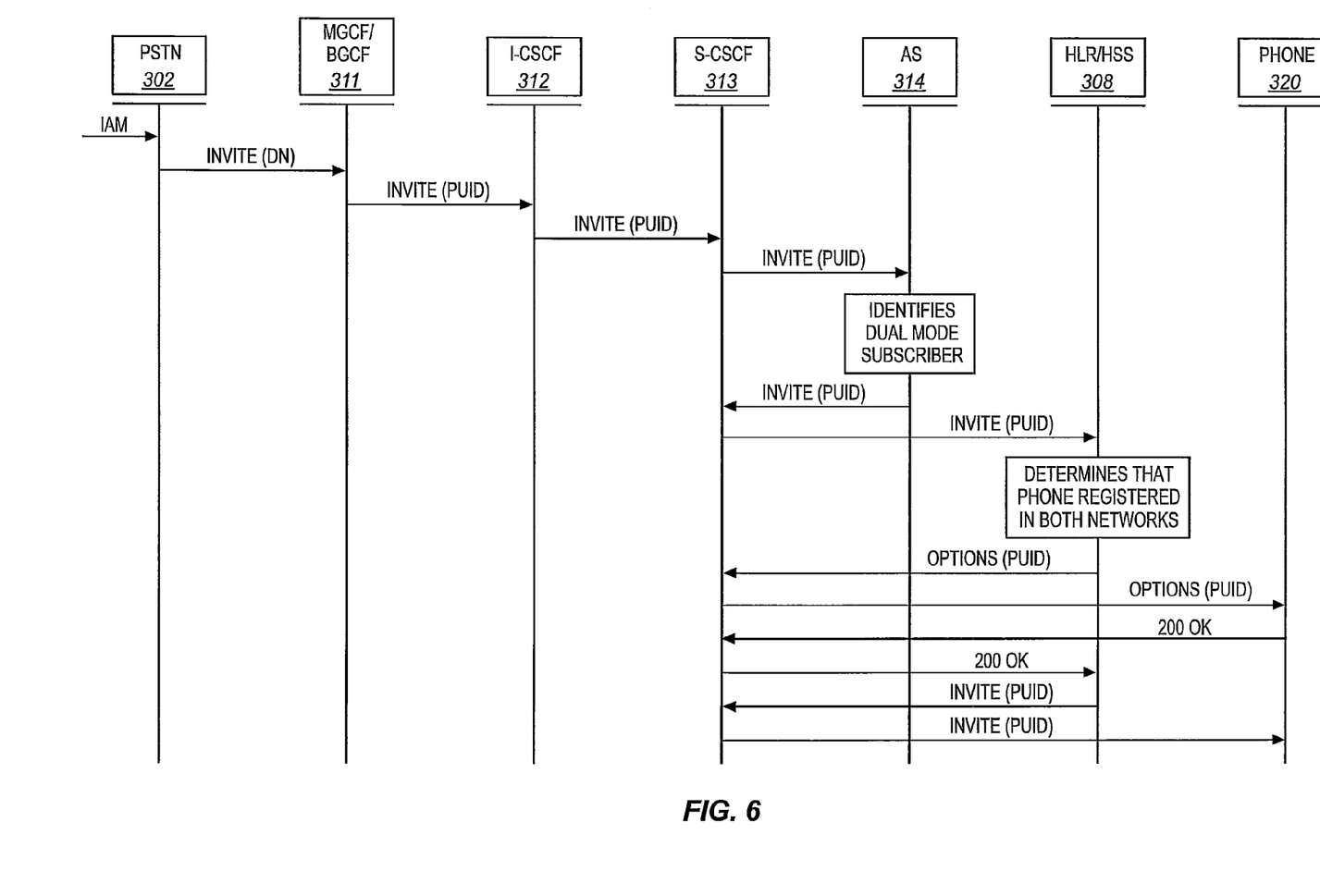

FIG. 6 illustrates an example where phone 320 is registered in both networks 304-305. The messaging in FIG. 6 flows as in FIG. 4 so that HLR/HSS 308 receives an INVITE message from S-CSCF 313. Responsive to the INVITE message, HLR/HSS 308 determines in which network 304 or 305 phone 320 is registered. In this example, phone 320 is registered in both networks 304-305. HLR/HSS 308 then pings phone 320 to determine if phone 320 is available in WiFi/IMS network 304 to receive the call. To ping phone 320, HLR/HSS 308 transmits a SIP OPTIONS message to phone 320 through S-CSCF 313. A SIP OPTIONS message is not traditionally used in SIP-based networks for call setup. Thus, WiFi/IMS network 304 and phone 320 do not perform the normal call setup processes responsive to the OPTIONS message. The OPTIONS message is intended to illicit a response (i.e., a SIP 200 OK message) from device 320 without initiating call setup processes or causing phone 320 to provide a ring tone to mobile subscriber 322.

If device 320 is in the service area of WiFi/IMS network 304, then phone 320 is provisioned to transmit a SIP 200 OK message back to HLR/HSS 308 responsive to receiving the OPTIONS message. If HLR/HSS 308 receives the 200 OK message back from phone 320, then HLR/HSS 308 can determine that phone 320 is available to receive the call over WiFi/IMS network 304. HLR/HSS 308 then transmits an INVITE message to phone 320 through S-CSCF 313 and access point 315 to complete the call through WiFi/IMS network 304 to phone 320.

In this embodiment, HLR/HSS 308 is adapted to set a first timer responsive to transmitting the OPTIONS message to monitor a first time out for the response (a 200 OK message in FIG. 6) to the OPTIONS message. Similarly, HLR/HSS 308 is adapted to set a second timer responsive to transmitting the INVITE message to monitor a second time out for a response (not shown in FIG. 6) to the INVITE message. In this embodiment, the first time out for the OPTIONS message is less than the second time out for the INVITE message to provide a faster ping to phone 320 than can be used with an INVITE message.

The advantage of using an OPTIONS message versus an INVITE message for the ping is further illustrated as follows. According to SIP standards, there is a defined call setup procedure using INVITE messages. As stated in the Background, after the INVITE message is sent, the HLR/HSS 308 waits for a time period for a response from phone 320. If there is a time out, HLR/HSS 308 may transmit a SIP TRYING message to PSTN 302 to notify PSTN 302 of the status of the call. HLR/HSS 308 may also transmit one or more (Re) INVITE messages to phone 320 to attempt to set up the call. On the other hand, the OPTIONS messages is not associated with call setup and thus does not have defined procedures for transmitting TRYING messages, multiple OPTIONS message, or other messages used for traditional call setup. Thus, the OPTIONS message may be used to provide a quick "ping" to phone 320 to determine the availability of phone 320. Other SIP messages may be used instead of an OPTIONS message as long as the other SIP messages provide a quick ping to phone 320 as does the OPTIONS message.

Figure 7:
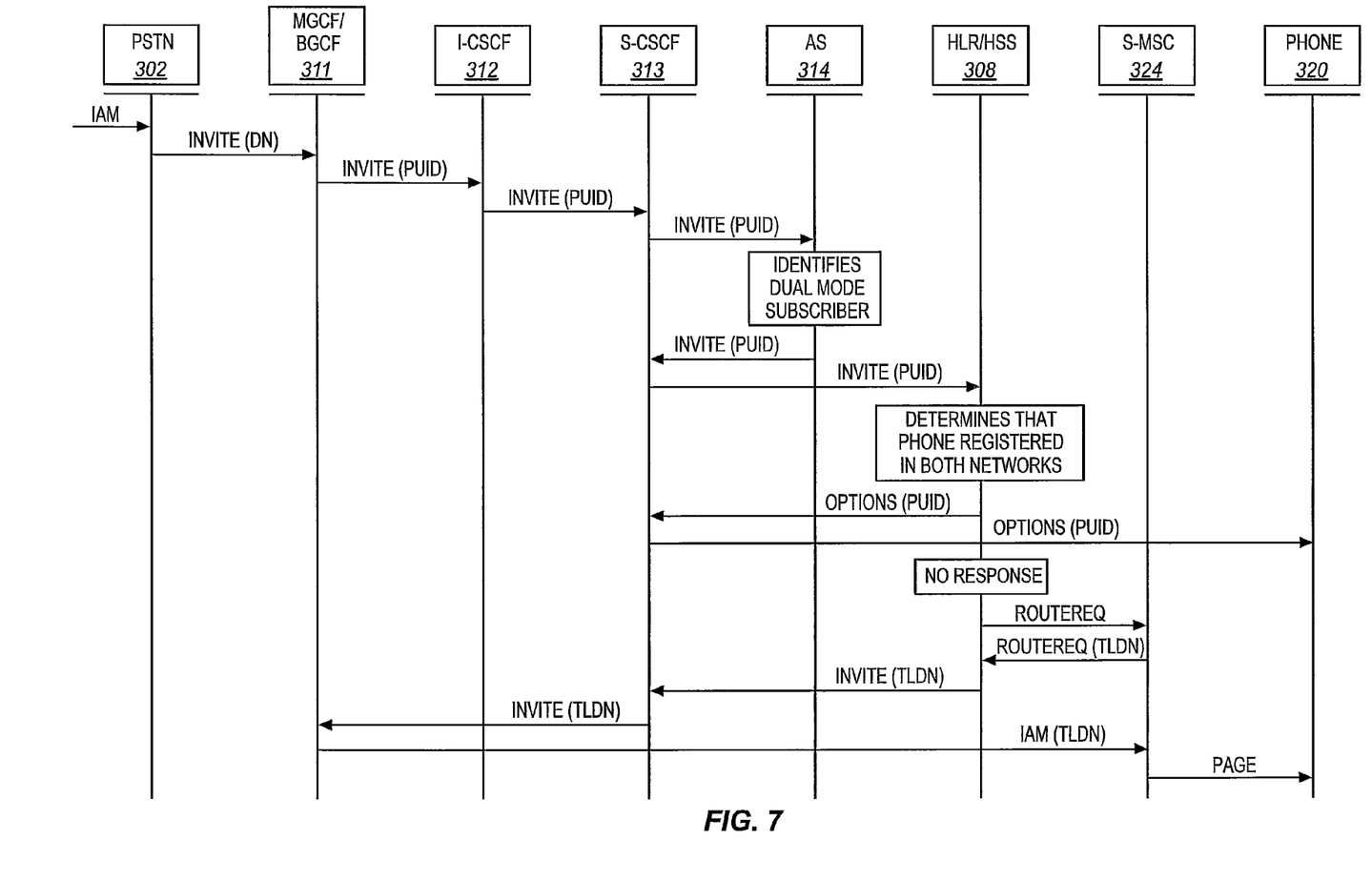

FIG. 7 illustrates another example where phone 320 is registered in both networks 304-305. The messaging in FIG. 7 flows as in FIG. 4 so that HLR/HSS 308 receives an INVITE message from S-CSCF 313. Responsive to the INVITE message, HLR/HSS 308 determines in which network 304 or 305 phone 320 is registered. In this example, phone 320 is registered in both networks 304-305. HLR/HSS 308 then pings phone 320 to determine if phone 320 is available in WiFi/IMS network 304 to receive the call. To ping phone 320, HLR/HSS 308 transmits a SIP OPTIONS message to phone 320 through S-CSCF 313.

If device 320 is not in the service area of WiFi/IMS network 304, then phone 320 is not able to respond to the OPTIONS message. If HLR/HSS 308 does not receive a response message back from phone 320 within a threshold time period, then HLR/HSS 308 can determine that phone 320 is not available to receive the call over WiFi/IMS network 304. HLR/HSS 308 then transmits a route request message (ROUTREQ) message to S-MSC 324 to determine routing information for the call. S-MSC 324 responds with a route request message indicating a temporary local directory number (TLDN) for the call. Responsive to the route request message, HLR/HSS 308 transmits an INVITE message to S-CSCF 313 indicating the TLDN. Based on the response from HLR/HSS 308, S-CSCF 313 is able to determine that the call needs to be routed to cellular network 305. Thus, S-CSCF 313 transmits an INVITE message to MGCF/BGCF 311 indicating the TLDN for the call. Based on the TLDN, MGCF/BGCF 311 transmits an IAM to S-MSC 324 to complete the call to phone 320 through cellular network 305. For instance, S-MSC 324 receives the IAM, and transmits the appropriate call setup signaling to phone 320 through base station 326, such as a page.

Although specific embodiments were described herein, the scope of the invention is not limited to those specific embodiments. The scope of the invention is defined by the following claims and any equivalents thereof.

We claim:

1. A communication network for providing call delivery to a dual mode wireless device, the communication network comprising:
    an IP Multimedia Subsystem (IMS) network operable to serve the dual mode wireless device; and
    a cellular network operable to serve the dual mode wireless device;
    the IMS network includes a call control function that is operable to receive a call to the dual mode wireless device, and determine that the dual mode wireless device is registered in both the IMS network and the cellular network,
    responsive to the determination that the dual mode wireless device is registered in both networks, the call control function is further operable to transmit a SIP OPTIONS message to the dual mode wireless device over the IMS network to determine if the dual mode wireless device is available over the IMS network for the call, and transmit a call setup message to the dual mode wireless device over the IMS network to attempt to set up the call over the IMS network responsive to receiving a response to the SIP OPTIONS message from the dual mode wireless device;
    the call control function is further operable to transmit a call setup message to the dual mode wireless device over the cellular network to attempt to set up the call over the cellular network responsive to not receiving a response to the SIP OPTIONS message from the dual mode wireless device.

2. The communication network of claim 1 wherein the call control function is further operable to:
    transmit a route request message to an MSC in the cellular network responsive to not receiving a response to the SIP OPTIONS message from the dual mode wireless device;
    receive a route response message from the MSC that includes a temporary local directory number (TLDN); and
    transmit the call setup message over the cellular network based on the TLDN.

3. The communication network of claim 1 wherein the call control function is further operable to:
    set a first timer responsive to transmitting the SIP OPTIONS message to monitor a first time out for the response to the SIP OPTIONS message; and
    set a second timer responsive to transmitting the call setup message to monitor a second time out for a response to the call setup message;
    wherein the first time out for the SIP OPTIONS message is less than the second time out for the call setup message.

4. The communication network of claim 1 wherein the call setup message comprises a SIP INVITE message.

5. The communication network of claim 4 wherein the SIP OPTIONS message does not cause the dual mode wireless device to provide a ring tone.

6. The communication network of claim 1 wherein the call control function includes a combined Home Location Register (HLR)/Home Subscriber Server (HSS) operable to store a subscriber record for the IMS network and the cellular network.

7. A method for providing call delivery to a dual mode wireless device, the method comprising:
    receiving a call to the dual mode wireless device in an IP Multimedia Subsystem (IMS) network;
    determining if the dual mode wireless device is registered in both the IMS network and a cellular network;
    if the dual mode wireless device is registered in both the IMS network and the cellular network, then transmitting a SIP OPTIONS message to the dual mode wireless device over the IMS network to determine if the dual mode wireless device is available over the IMS network for the call;
    transmitting a call setup message to the dual mode wireless device over the IMS network to attempt to set up the call over the IMS network responsive to receiving a response to the SIP OPTIONS message from the dual mode wireless device; and
    transmitting a call setup message to the dual mode wireless device over the cellular network to attempt to set up the call over the cellular network responsive to not receiving a response to the SIP OPTIONS message from the dual mode wireless device.

8. The method of claim 7 wherein transmitting a call setup message to the dual mode wireless device over the cellular network comprises:
    transmitting a route request message to an MSC in the cellular network responsive to not receiving a response to the SIP OPTIONS message from the dual mode wireless device;
    receiving a route response message from the MSC that includes a temporary local directory number (TLDN); and
    transmitting the call setup message over the cellular network based on the TLDN.

9. The method of claim 7 further comprising:
    setting a first timer responsive to transmitting the SIP OPTIONS message to monitor a first time out for the response to the SIP OPTIONS message; and
    setting a second timer responsive to transmitting the call setup message to monitor a second time out for a response to the call setup message;

wherein the first time out for the SIP OPTIONS message is less than the second time out for the call setup message.

10. The method of claim 7 wherein the call setup message comprises a SIP INVITE message.

11. The method of claim 10 wherein the SIP OPTIONS message does not cause the dual mode wireless device to provide a ring tone.

12. A method for providing call delivery to a dual mode wireless device, the method comprising:
  receiving a call to a dual mode wireless device in a subscriber database of a wireless data network that stores subscriber records for users of the wireless data network;
  determining, in the subscriber database, that the dual mode wireless device is registered in both the wireless data network and a wireless voice network;
  determining, in the subscriber database, if the dual mode wireless device is available to the wireless data network prior to attempting to set up the call to the dual mode wireless device over the wireless data network using a SIP OPTIONS message;
  attempting to set up the call to the dual mode wireless device over the wireless data network if the dual mode wireless device is available to the wireless data network; and
  attempting to set up the call to the dual mode wireless device over the wireless voice network if the dual mode wireless device is not available to the wireless data network.

13. The method of claim 12 wherein determining if the dual mode wireless device is available to the wireless data network comprises:
  transmitting the SIP OPTIONS message to the dual mode wireless device over the wireless data network prior to call setup to determine if the dual mode wireless device is available over the wireless data network for the call.

14. The method of claim 12 wherein attempting to set up the call to the dual mode wireless device over the wireless data network comprises:
  transmitting a SIP INVITE message to the dual mode wireless device over the wireless data network.

15. The method of claim 12 wherein the wireless data network comprises an IP Multimedia Subsystem (IMS) network and the wireless voice network comprises a cellular network.

* * * * *

UNITED STATES PATENT AND TRADEMARK OFFICE
CERTIFICATE OF CORRECTION

| | | |
|---|---|---|
| PATENT NO. | : 8,340,673 B2 | Page 1 of 1 |
| APPLICATION NO. | : 11/421110 | |
| DATED | : December 25, 2012 | |
| INVENTOR(S) | : Lin et al. | |

It is certified that error appears in the above-identified patent and that said Letters Patent is hereby corrected as shown below:

In the Specification

In column 6, lines 39-40, the text "Media Gateway Control Function (MGCF)/Brealcout Gateway Control Function" should read -- Media Gateway Control Function (MGCF)/Breakout Gateway Control Function --

In column 7, line 4, the text "phone 320 registers with either orboth" should read -- phone 320 registers with either or both --

Signed and Sealed this
Eighteenth Day of June, 2013

Teresa Stanek Rea
*Acting Director of the United States Patent and Trademark Office*